(12) United States Patent
Hansen et al.

(10) Patent No.: US 7,353,393 B2
(45) Date of Patent: Apr. 1, 2008

(54) AUTHENTICATION RECEIPT

(75) Inventors: Mads Dore Hansen, Hadsund (DK);
Lars Romedahl, Sollentuna (SE);
Mikael Thuvesholmen, Malmo (SE)

(73) Assignee: Anoto Aktiebolag (Anoto AB), Lund (SE)

( * ) Notice: Subject to any disclaimer, the term of this patent is extended or adjusted under 35 U.S.C. 154(b) by 843 days.

(21) Appl. No.: 10/235,537

(22) Filed: Sep. 6, 2002

(65) Prior Publication Data

US 2003/0074562 A1 Apr. 17, 2003

Related U.S. Application Data

(60) Provisional application No. 60/318,799, filed on Sep. 11, 2001.

(30) Foreign Application Priority Data

Sep. 7, 2001 (SE) .................................. 0102965

(51) Int. Cl.
*H04L 9/00* (2006.01)
(52) U.S. Cl. ..................................... 713/170
(58) Field of Classification Search ............... 713/170; 726/1, 2, 10
See application file for complete search history.

(56) References Cited

U.S. PATENT DOCUMENTS

| 5,661,506 | A | 8/1997 | Lazzouni et al. | |
|---|---|---|---|---|
| 5,852,434 | A | 12/1998 | Sekendur | |
| 6,085,321 | A | 7/2000 | Gibbs et al. | |
| 6,681,045 | B1* | 1/2004 | Lapstun et al. | 382/187 |
| 2003/0012374 | A1* | 1/2003 | Wu et al. | 380/44 |

FOREIGN PATENT DOCUMENTS

| WO | WO 01/16691 A1 | 3/2001 |
|---|---|---|
| WO | WO 01/48591 A1 | 7/2001 |
| WO | WO 01/48678 A1 | 7/2001 |
| WO | WO 01/48685 A1 | 7/2001 |

OTHER PUBLICATIONS

Schneier, Bruce, Applied Cryptography, "Kerberos", 1996, Second Edition, pp. 566-571.*
"Security in Computing," Charles P. Pfleeger, Prentice-Hall, Inc., Upper Saddle River, New Jersey, 1997, pp. 412-415.
XP002328425: Dymetman, Marc and Copperman, Max, "Intelligent Paper"*Xerox Research Centre Europe*, pp. 392-406, (1998).

* cited by examiner

*Primary Examiner*—Gilberto Barrón, Jr.
*Assistant Examiner*—Farid Homayounmehr
(74) *Attorney, Agent, or Firm*—Birch, Stewart, Kolasch & Birch, LLP

(57) ABSTRACT

The present invention relates to a method, a system and a computer-readable medium storing computer-executable components for authenticating a digital pen. The invention is based on the idea that a paper look-up server issues an authentication receipt used by a service handler to authenticate a digital pen. The authentication receipt comprises such information that the service handler can use it to authenticate the digital pen without having to communicate with the paper look-up server.

43 Claims, 9 Drawing Sheets

AUTHENTICATION RECEIPT

This application claims priority on provisional Application No. 60/618,799 filed on Sep. 11, 2001, the entire contents of which are hereby incorporated by reference.

TECHNICAL FIELD OF THE INVENTION

The present invention relates to a method, a system and a computer-readable medium storing computer-executable components for authenticating a digital pen.

BACKGROUND ART

Traditionally, information is written and distributed by means of pen and paper. However, such paper-based information is difficult to manage and communicate in an efficient way.

Computers are to an ever-increasing extent used for management and communication of information. The information is typically input by means of a keyboard and stored in the computer memory, for example on a hard disk. However, it is a slow process to input information with a keyboard, and there is a significant risk of errors occurring in the process. Graphic information, such as drawings and images, is normally fed to the computer through a separate device, such as a scanner or the like. The process of feeding such information to the computer is time consuming, lengthy, and often yields unsatisfactory results. When the information eventually is located in the computer, it can easily be communicated to others, for example as an e-mail or SMS via an Internet connection, or as a fax via a fax modem.

The present Applicant has proposed a remedy to this problem in the international application WO 01/16691, which is incorporated herein by this reference and in which the Applicant envisages the use of a product having a writing surface which is provided with a position code. The position code, which codes a plurality of positions on the surface, enables electronic recording of information that is being written on the writing surface. The information is written on the surface by means of a digital pen. The pen has a sensor, which detects the position code on the surface. The pen records information by recording the detected position code. The position code is capable of coding coordinates of a large number of positions, much larger than the number of necessary positions on one single product. Thus, the position code can be seen as forming a virtual surface, which is defined by all positions that the position code is capable of coding, different positions on the virtual surface being dedicated for different functions and/or actors. The pen communicates with a server with knowledge of the functionality of every position on the virtual surface and any actor associated with each such position.

The above concept can be used for a number of different purposes. The combination of pen and position coded product can be used as an input device to a computer, a PDA, a mobile phone or the like. For example, text and sketches written on a position-coded notepad can be transferred via the pen to a computer. Additionally, the combination of pen and position-coded product allows for global communication, directly from the product via the pen, by the position code on the product being dedicated for such communication. For example, the information registered by the pen can be transformed to a fax message, an e-mail or an SMS, and then be sent from the pen to a recipient. Further, the combination of pen and position-coded product can be used in e-commerce. For example, the digital pen can be used to order an item from a position-coded advertisement, which advertisement is associated with a service handler, in a magazine, by the position code in the advertisement being dedicated for such a service.

In the communication between the different participants in the above concept, it is desirable that the information is sent in a secure way, i.e. by using encryption and digital signatures. If the pen sends confidential information to a recipient, the pen encrypts the information and the recipient will, in order to decipher the information, decrypt it. The pen can use both symmetric and asymmetric encryption. Both types of encryption provide confidentiality (the information is kept secret during transmission) and authentication (assuring the receiver that the identity of the sender of the information is not false). Authentication protects two parties exchanging data from a third party, but it does not protect the two parties from each other. Typically, it should not be possible for any one of the two parties to deny having received or transmitted certain information. When there is not complete trust between the receiver and transmitter, digital signatures are preferably used. By employing asymmetric encryption it is possible to assign digital signatures to the information sent, thereby obtaining non-repudiation (neither the sender nor the recipient of information is able to deny the transmission) of received or transmitted information. The integrity (the information has not been altered during the transmission) of the information must also be guaranteed. This is achieved by using hash functions.

When using symmetric encryption, the same key is used for both encryption and decryption, i.e. the transmitter and receiver shares two copies of the same key. The key is used in conjunction with an algorithm, and different keys will produce different output results from the algorithm. The security of the encryption depends on the secrecy of the key, not the secrecy of the algorithm. This makes it possible to use powerful standard algorithms, such as the Triple Data Encryption Standard (3-DES) algorithm, the Advanced Encryption Standard (AES) algorithm or the International Data Encryption Algorithm (IDEA). The security also depends on the length of the key. The longer the key, the more difficult it is to break the cipher.

Asymmetric encryption works in a similar way, but is based on a pair of keys; one secret, private key and one public key. Often four keys are used, one public key and one private key for confidentiality and one public key and one private key for authentication and digital signature. The sender uses the public key of the receiver to encrypt the information and the receiver uses its private key to decrypt the information. Only a receiver with a private key corresponding to the public key can read the information, thus providing confidentiality. For authentication and digital signature, the sender uses its private key to encrypt the information and the receiver uses the public key of the sender to decrypt the information. If the receiver is able to decrypt the information, it is ascertained that it was encrypted with the corresponding private key, and thus by the corresponding sender. Commonly used public-key algorithms are, for example, the Diffie-Hellman (DH) algorithm and the Rivest-Shamir-Adleman (RSA) algorithm.

Although the legitimate person has signed the information, it is not possible to know from digital signatures alone if the information has been delivered in its entirety. What is needed is a mechanism that delivers some kind of fingerprint of the unique information. Mathematically, these mechanisms are called hash functions. Hash functions take variable-length input strings and convert them to fixed-length output strings, so called hash values. The hash value can then be used to indicate whether a candidate input is likely to be the same as the real input. One-way hash functions are functions that easily compute hash values from the input strings, but with which it is computationally hard to generate another input value that hashes to the same value. This way, hash functions can be used when sending information to ensure the receiver the integrity of the information. The hash value of the information is calculated and sent along with the information. The receiver can then simply make a hash value of the received information and compare this to the hash value sent. If these match, the recipient is also guaranteed a match between the information received and the information sent, on condition that the hash value itself, or the information sent along with the hash value, is protected. Protection of the hash value, or the information sent along with the hash value, is necessary because the hash function itself is not considered to be secret.

In many encryption algorithms random number data is used for different reasons. One is that random data by its nature is difficult to determine or guess, making random numbers suitable as keys.

A problem with the provision of confidentiality, authentication, non-repudiation and integrity is the generation of a relatively great amount of traffic between the different participants.

A digital pen that wants to communicate with a service handler must prior to that communication contact a paper look-up server. A problem in connection with the communication between a digital pen and a service handler is that before the service handler can start communicating with the digital pen, the service handler must ask the paper look-up server, or any other means with corresponding authority, to authenticate the digital pen.

Normally, in a system comprising the above mentioned participants, a relatively large number of transactions between a pen and different service handlers occurs, and each service handler usually authenticates the pen. Moreover, it is envisaged that a digital pen will perform a large number of transactions during a short time period. The digital pen user can perform a large number of errands by means of the pen, for example order various products from a service handler, carry out banking transactions via a paper form provided by the bank etc.

A problem associated with a large number of transactions relating to authentication of digital pens between the paper look-up server and the service handlers is that the load on these will increase.

SUMMARY OF THE INVENTION

An object of the present invention is therefore to reduce the traffic between the participants during authentication of the digital pen.

This object is achieved by a method for authenticating a digital pen at a service handler in a system including at least one paper look-up server, at least one digital pen and at least one service handler according to claim 1, a system for authentication according to claim 22 and a computer-readable medium storing computer-executable components in accordance with claim 43. Preferred embodiments are defined by the dependent claims.

According to a first aspect of the invention, a method is provided where an authentication receipt is created at a paper look-up server, which authentication receipt is used by a service handler to authenticate a digital pen.

According to a second aspect of the invention, a system is provided comprising at least a digital pen, at least a paper look-up server and at least a service handler, wherein an authentication receipt is created at a paper look-up server, which authentication receipt is used by a service handler to authenticate a digital pen.

The invention is based on the idea that the paper look-up server issues an authentication receipt used by a service handler to authenticate the digital pen, thus avoiding communication between the service handler and the paper look-up server.

Digital pen information data is encrypted, preferably with a symmetric key shared by the digital pen and a paper look-up server, and sent, together with a digital pen identifier, from the digital pen to the paper look-up server. The digital pen information data is encrypted with a symmetric key shared by the digital pen and the paper look-up server to assure the paper look-up server that the digital pen information data actually originates from the digital pen. The digital pen identifier is provided so that the paper look-up server can find the symmetric key corresponding to the correct digital pen when decrypting the digital pen information data. Based on the digital pen information data from the digital pen, the paper look-up server identifies the service handler the digital pen wants to access and sends a message back to the digital pen including an address to the service handler and an authentication receipt. The use of authentication receipt implies that the paper look-up server must be completely trusted, since the authentication receipt gives a digital pen access to a service handler. A possible scenario is that pirate copies of the digital pens will circulate. It is then important that the paper look-up server does not provide these pens with authentication receipts. A digital pen owner might have a subscription at a specific service handler, paying a fee to access it. It is desirable that an unauthorized digital pen is unable to exploit these services for free.

The paper look-up server thus authenticates the digital pen by means of the decryption of digital pen information data and creates an authentication receipt for authentication of the digital pen at the service handler. The paper look-up server sends the authentication receipt and paper look-up server information data, which paper look-up server information data comprises the service handler identity, to the digital pen. The digital pen now knows to which service handler it should send data and sends the authentication receipt to said service handler. The service handler receives the authentication receipt from the digital pen, which receipt comprises such information that the service handler can use it to authenticate the digital pen without having to communicate with the paper look-up server. Due to the fact that the paper look-up server issues an authentication receipt, it is not necessary for the service handler to contact the paper look-up server to validate the digital pen. By authenticating the digital pen at the paper look-up server by means of the decryption of digital pen information data, it is not necessary to, for example, send a digital pen password via the network to achieve access to the server. Neither is it necessary to store passwords at a network server for authentication purposes. By employing the encryption approach, the digital pen user need not perform any "manual" operations such as the above mentioned password procedure.

According to an embodiment of the invention, the data sent from the digital pen to the paper look-up server is provided with a digital signature, providing not only authentication but also non-repudiation of the digital pen information data.

According to a further embodiment of the invention, the authentication receipt is, at the paper look-up server, provided with a first digital signature created by the paper look-up server. It is desirable that the authentication receipt can be securely authenticated at the service handler, ensuring the handler that the receipt actually came from the paper look-up server. By means of the first digital signature, non-repudiation of the receipt is further provided.

According to another embodiment of the invention, a second digital signature is created at the paper look-up server, which second digital signature is sent to the digital pen. Since the server sends information or instructions to the digital pen, in addition to the authentication receipt, such as the address of the service handler or whether the information data transferred from the digital pen to the service handler should be encrypted or not, it is necessary to provide assurance to the digital pen that the authentication receipt actually originates from the paper look-up server. The digital pen authenticates the paper look-up server by means of the second digital signature. As mentioned earlier, digital signatures enable authentication and obstruct repudiation by (i) the recipient that data has been received and (ii) the sender that data has been sent. The concept of digital signatures greatly improves the security of the system.

According to yet another embodiment of the invention, the authentication receipt is provided with a unique receipt identifier. The unique identifier prevents ill-intentioned third parties to produce their own authentication receipts. With the unique identifier, it is possible to keep track of the receipts that are, or have been, in use in the system. The authentication receipt can also be provided with a timestamp. If someone would eavesdrop on the network and capture a copy of the receipt, it would be possible for the eavesdropper to use the receipt for communication with a service handler. With the timestamp, it is possible to have a predetermined limited period of time, a lifetime, during which period of time the receipt is valid. If this lifetime is short enough, it is not likely that an eavesdropper manages to use the receipt within the limited time period, even if the eavesdropper would capture the receipt. The authentication receipt can further be provided with the digital pen identifier. This identifier is included in the receipt to indicate that the receipt has been issued on behalf of the digital pen. A paper look-up server key identifier could be included in the authentication receipt in order for the service handler to find the public key of the paper look-up server that corresponds to the private key of the paper look-up server, when authenticating the receipt. The service handler fetches the public key from a key store database, in which database public keys of the paper look-up server are stored.

According to further embodiments of the invention, to hamper eavesdroppers, the unique identifier and/or the timestamp and/or the digital pen identifier can be encrypted, resulting in the fact that confidentiality is provided to such parameters. The encryption can be performed with a symmetric key known by the paper look-up server and the service handler.

According to yet a further embodiment of the invention, to further hamper eavesdroppers, the paper look-up server can encrypt the authentication receipt. The encryption is preferably performed with a symmetric key known by the paper look-up server and the digital pen. The digital pen can first decrypt the authentication receipt and then encrypt it, preferably with a symmetric key, before sending the encrypted authentication receipt to a service handler. Thus, the authentication receipt is provided with confidentiality on its way from the paper look-up server via the digital pen to the service handler. If an eavesdropper captures the receipt, the eavesdropper is unable to use the receipt, since only a party in possession of the symmetric key associated with each encryption can decrypt the receipt. Also, by encrypting the receipt with a symmetric key known by the paper look-up server and the digital pen, the digital pen authenticates the paper look-up server by decrypting the receipt.

It is important to understand that the system allows different levels of security. If, for example, a digital pen is used to execute an e-commerce transaction where the credit card number of the digital pen owner is sent across the network to a service handler, it is of utmost importance that the transfer of the credit card number is secure. On the other hand, if graphical e-mails or other non-sensitive information is transferred, it is likely that a very low level of security needs to be employed. It is not desirable to force the digital pen and the paper look-up server to perform computationally demanding operations in terms of processing power, such as providing data with digital signatures and encrypting data, in cases where it is not necessary. The paper look-up server decides the level of security. A number of combinations are possible, the extremes are where no security is employed or where all information data sent between the components in the system is encrypted, including encrypting the authentication receipt.

Further features of, and advantages with, the present invention will become apparent when studying the appended claims and the following description.

BRIEF DESCRIPTION OF THE DRAWINGS

Exemplifying embodiments of the invention will be described in greater detail with reference to the accompanying drawings, in which.

DESCRIPTION OF PREFERRED EMBODIMENTS OF THE INVENTION

Figure 1:
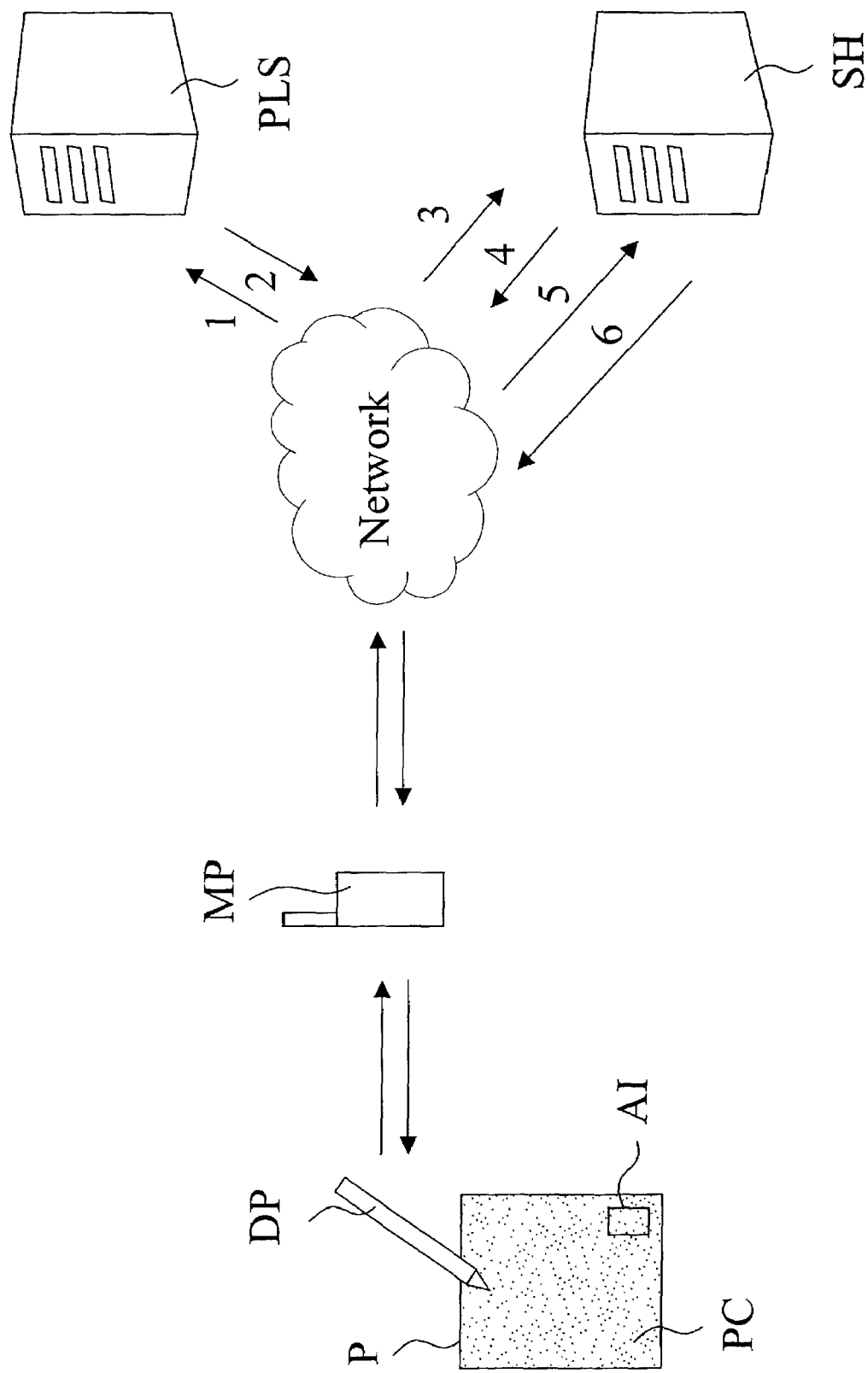
FIG. 1 shows a system for management and communication of information in which the present invention advantageously may be applied.

A system for management and communication of information is shown in FIG. 1. Such a system is further disclosed in the Applicant's international patent applications PCT/SE00/02640, PCT/SE00/02641, and PCT/SE00/02659, which applications are incorporated herein by reference. The system of FIG. 1 comprises a plurality of digital pens DP, a plurality of products P with a position code PC, a paper look-up server PLS executing a paper look-up service, and a plurality of service handler units SH. The paper look-up service comprises one or more servers communicating with a database containing the virtual surface formed by the position code and information related thereto. This virtual surface contains all positions that the position code is capable of coding and the functionality of every position on the virtual surface and the actor associated with each such position. The service handler unit SH is a server unit effecting a service, such as storing or relaying digital information, or initiating transmission of information or items to a recipient. In the example hereinabove, a digital pen is employed, but a digital pen could also be equivalent with, for example, a mobile phone, a PDA or the like provided with the characteristics of a digital pen. Furthermore, it is understood that these exemplified devices could be merged into one single device.

When the digital pen DP is operated to mark an activation icon AI on the position-coded product P, the pen DP initiates an operation to forward a message to the paper look-up server PLS (step 1), for example via short-range radio transmission to a mobile phone MP acting as a modem for connection to the paper look-up server PLS. The message contains a unique pen identifier and at least one position from the digital information that has been recorded electronically on the writing surface of the product P. Based on the position content of the message, the paper look-up server PLS instructs the digital pen DP to contact a specific service handler unit SH (step 2). The pen DP then sends the message to the service handler unit SH (step 3), which instructs the pen DP on what data to send, and how to format and tag that data (step 4). After having received the requested data from the pen DP (step 5), the service handler unit SH returns a verification thereof to the pen DP (step 6).

The present invention can be applied in the system shown in FIG. 1, as will be described in the following with reference to FIG. 2. The pen DP sends encrypted pen information data and a pen identifier, and possibly also a digital signature created by the pen, to the paper look-up server PLS. The pen information data is advantageously encrypted by a symmetric key known by the pen DP and the paper look-up server PLS (step 1). The paper look-up server PLS authenticates the pen DP by means of the decryption or, if present, the digital signature created by the pen, and creates an authentication receipt including a unique authentication receipt identifier, a timestamp, and the digital pen identifier. These parameters are encrypted with a symmetric key. The receipt also includes a first digital signature created by the paper look-up server PLS, which first signature is later used by the service handler to authenticate the digital pen. A second digital signature is optionally created by the PLS and is used by the digital pen to authenticate the PLS. The PLS encrypts PLS information data, which PLS information data instructs the pen DP which service handler SH it should contact, and the authentication receipt with a symmetric key known by the paper look-up server PLS and the pen DP and sends the encrypted data to the pen DP (step 2). The pen DP receives the encrypted data, decrypts it and authenticates the paper look-up server PLS by means of the second digital signature, if present, created by the PLS. Normally, the authentication of the paper look-up server PLS at the pen DP is performed by encrypting the authentication receipt. The pen DP then encrypts the pen information data and the authentication receipt with a symmetric key and sends the symmetrically encrypted data to the service handler SH designated by the paper look-up server PLS (step 3). The service handler SH decrypts the pen information data and the authentication receipt and authenticates the pen DP by means of the first digital signature included in the authentication receipt and thus a roundtrip of transferring authentication data between the service handler SH and the paper look-up server PLS is avoided. The present invention will be described in greater detail in the following figures.

Figure 2:
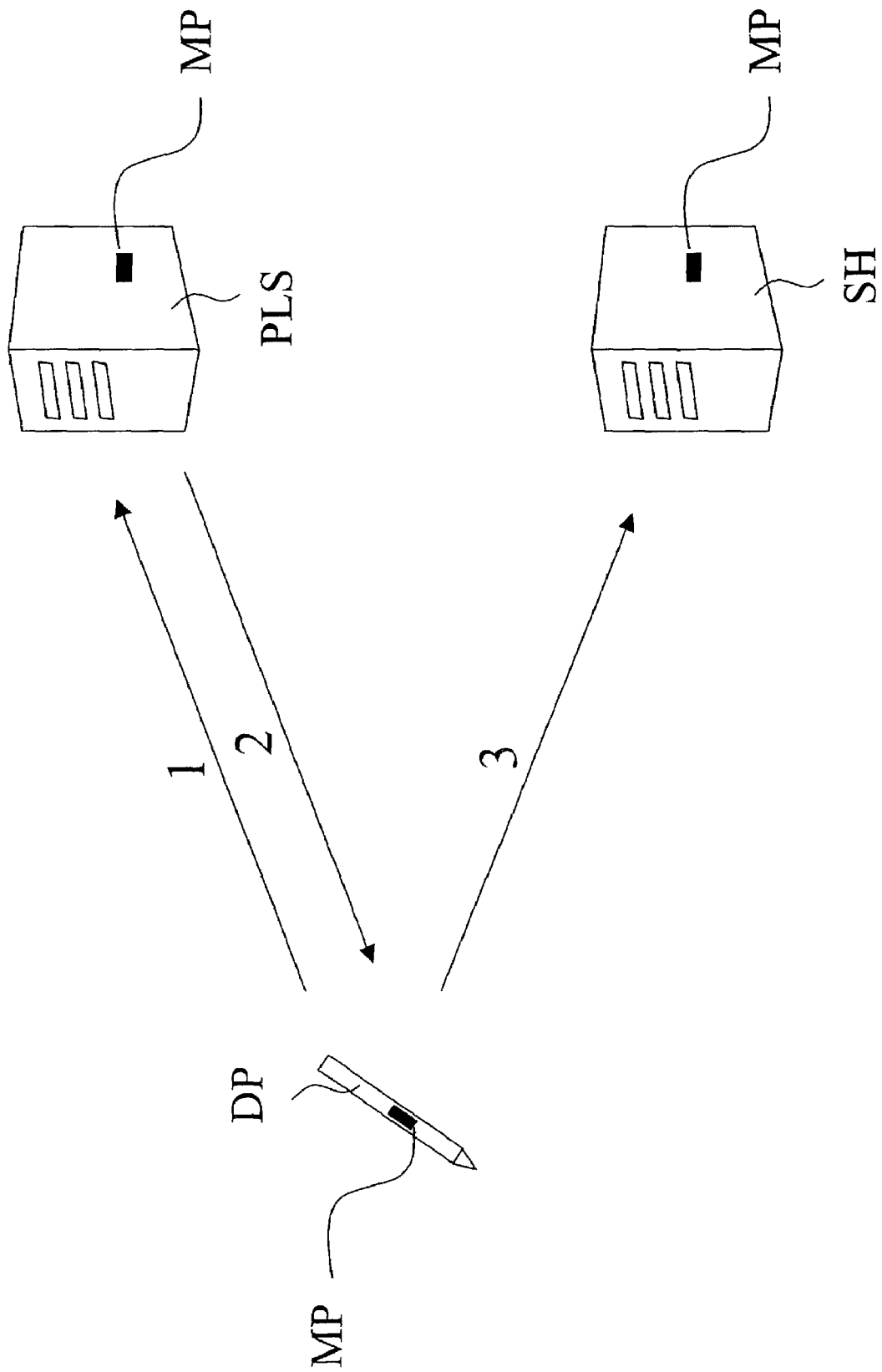
FIG. 2 shows how the present invention can be applied in a system for management and communication of information.

As is clearly understood by those of ordinary skills in the art, the different steps described with reference to FIG. 2 is performed by a microprocessor MP arranged in the pen DP, the paper look-up server PLS and the service handler SH, respectively.

It should be noted that those skilled in the art will realize that a number of different implementations are possible when encrypting data. The encryption can be performed with symmetric keys or asymmetric keys, digital signatures can be provided, encryption can be omitted for certain data etc. It is understood that the different embodiments, and features thereof, can be combined to create new embodiments not shown in this application.

Figure 3:
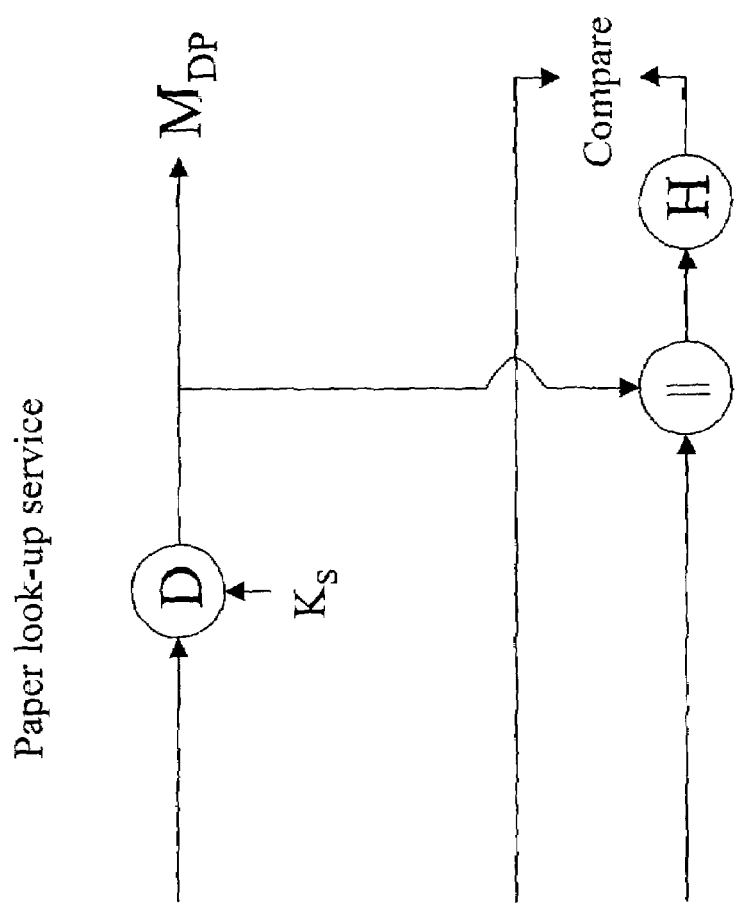
FIG. 3 is a block diagram showing an embodiment of the present invention when providing authentication, integrity and confidentiality of the pen information data sent to the paper look-up service.
Figure 3:
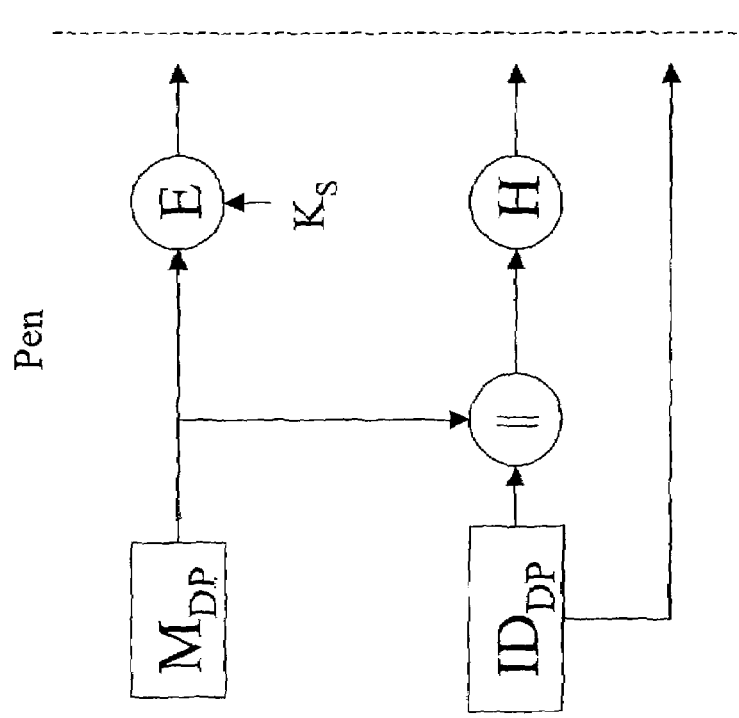

FIG. 3 shows how the pen provides authentication, integrity and confidentiality of the pen information data $M_{DP}$ when transferring data to the paper look-up service (i.e. the service running on the paper look-up server). In the figure, E denotes encryption and D decryption. Confidentiality and authentication of the pen information data $M_{DP}$ is provided by encrypting the pen information data $M_{DP}$ with a symmetric key $K_S$ shared by the pen and the paper look-up service. The pen information data $M_{DP}$ is concatenated, denoted ||, with the pen identifier $ID_{DP}$. The hash value of $M_{DP}||ID_{DP}$, $H(M_{DP}||ID_{DP})$, is calculated and sent along with the encrypted pen information data and the pen identifier $ID_{DP}$, thus obtaining integrity of the data sent to the paper look-up service.

The paper look-up service then fetches the symmetric key $K_S$ from a pen key database, which database contains the symmetric key corresponding to each pen in the system. This is possible due to the fact that the pen identifier is transferred along with the pen information data $M_{DP}$. The paper look-up service decrypts the encrypted pen information data with the symmetric key $K_S$, recreating the pen information data $M_{DP}$. The pen identifier $ID_{DP}$ is concatenated to the received pen information data $M_{DP}$ on the recipient side. The concatenated data $M_{DP}||ID_{DP}$ is evaluated in a hash function, which operation produces a hash value $H(M_{DP}||ID_{DP})$. The hash value is compared to the received hash value $H(M_{DP}||ID_{DP})$. If neither the pen information data $M_{DP}$, nor the pen identifier $ID_{DP}$, or both, have been altered, the comparison will match, thus assuring the integrity of the received data.

Figure 4:
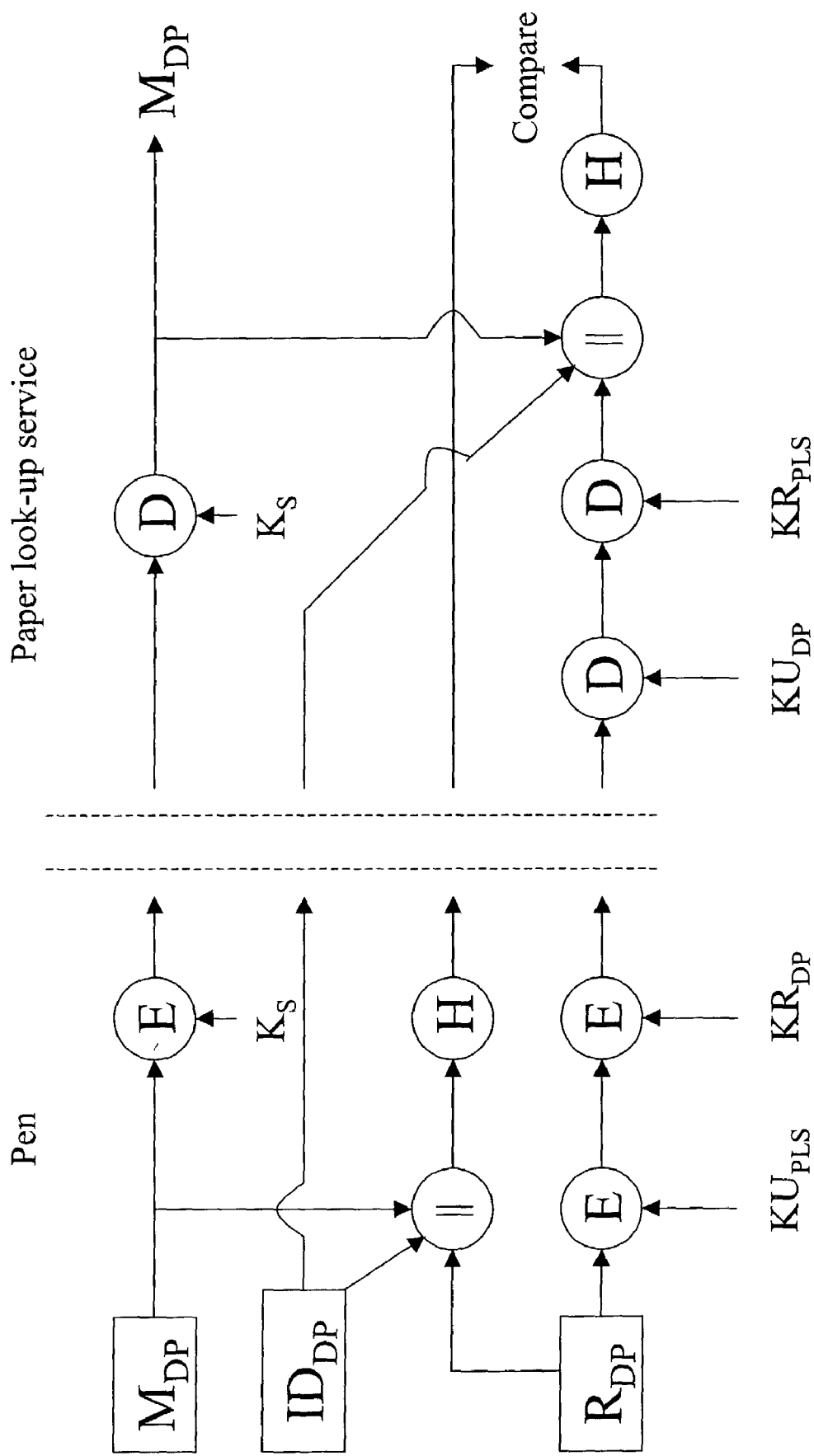
FIG. 4 is a block diagram showing an embodiment of the present invention when providing authentication, integrity, non-repudiation and confidentiality of the pen information data sent to the paper look-up service.

FIG. 4 shows how the pen provides authentication, integrity, non-repudiation and confidentiality of the pen information data $M_{DP}$ when transferring data to the paper look-up service. A random number $R_{DP}$ is generated and encrypted with the public key $KU_{PLS}$ of the paper look-up service, which encryption provides the confidentiality of the random number. The encrypted random number is then encrypted with the private key $KR_{DP}$ of the pen, which encryption provides the digital signature, thereby obtaining authentication and non-repudiation. Confidentiality of the pen information data $M_{DP}$ is provided by encrypting the pen information data $M_{DP}$ with a symmetric key $K_S$ shared by the pen and the paper look-up service. The pen information data $M_{DP}$ is concatenated with the random number $R_{DP}$ and the pen identifier $ID_{DP}$. The hash value of $M_{DP}\|R_{DP}\|ID_{DP}$, H $(M_{DP}\|R_{DP}\|ID_{DP})$, is calculated and sent along with the encrypted and signed random number, the encrypted pen information data and the pen identifier $ID_{DP}$, thus obtaining integrity of the data sent to the paper look-up service.

The paper look-up service then fetches the symmetric key $K_S$ from a pen key database, which database contains the symmetric key corresponding to each pen in the system. This is possible due to the fact that the pen identifier is transferred to the paper look-up service. The paper look-up service decrypts the encrypted pen information data with the symmetric key $K_S$, recreating the pen information data $M_{DP}$. The paper look-up service uses the public key of the pen $KU_{DP}$ and the private key $KR_{PLS}$ of the paper look-up service to decrypt the random number $R_{DP}$. The random number $R_{DP}$ is concatenated to the received pen information data $M_{DP}$ and the pen identifier $ID_{DP}$ on the recipient side. The concatenated data $M_{DP}\|R_{DP}\|ID_{DP}$ is evaluated in a hash function, which operation produces a hash value $H(M_{DP}\|R_{DP}\|ID_{DP})$. The hash value is compared to the received hash value $H(M_{DP}\|R_{DP}ID_{DP})$. If neither the pen information data $M_{DP}$, nor the random number $R_{DP}$, the pen identifier $ID_{DP}$, or all three parameters, have been altered, the comparison will match, thus assuring the integrity of the received data.

The order of encryption of the random number $R_{DP}$, i.e. to first encrypt with the public key $KU_{PLS}$ of the paper look-up service and then encrypt with the private key $KR_{DP}$ of the pen, is employed because it should not be possible to save the signed random number for later use. Clearly, it is possible to first encrypt with the private key $KR_{DP}$ of the pen and then encrypt with the public key $KU_{PLS}$ of the paper look-up service. This will, however, result in a lower level of security.

Figure 5:
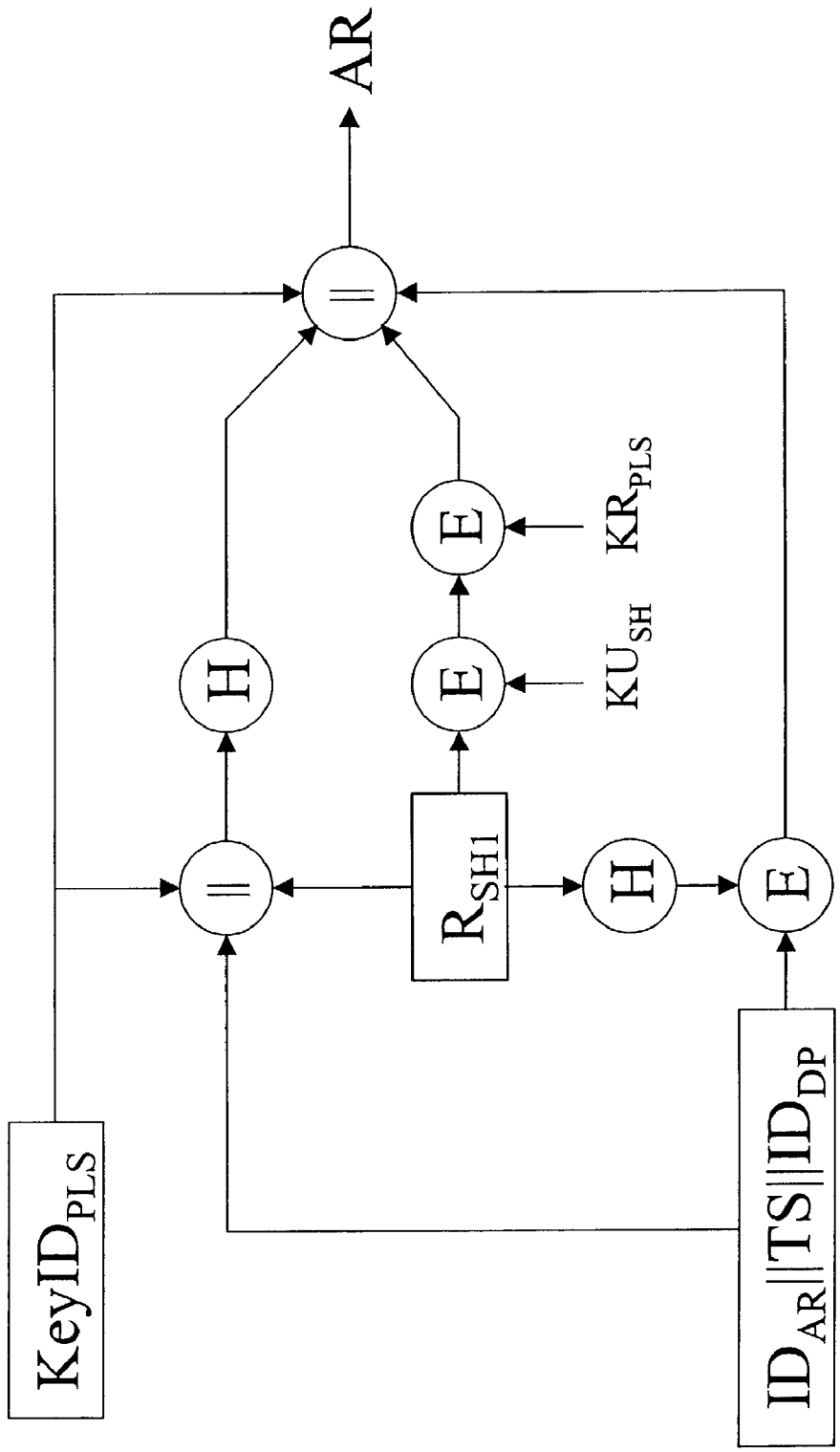
FIG. 5 is a block diagram showing another embodiment of the present invention when creating an authentication receipt at the paper look-up service.

FIG. 5 illustrates how the paper look-up service creates an authentication receipt AR. A random number $R_{SH1}$ is generated and encrypted with the public key $KU_{SH}$ of the service handler, thereby providing confidentiality of the random number. The encrypted random number is then encrypted with the private key $KR_{PLS}$ of the paper look-up service, thus obtaining the digital signature of the paper look-up service for authentication at the service handler. The random number is later used for decryption at the service handler. The random number $R_{SH1}$ is evaluated in a hash function and the hash value is used for symmetric encryption of the pen identifier $ID_{DP}$, the authentication receipt identifier $ID_{AR}$ and the timestamp TS. The paper look-up service key identifier $KeyID_{PLS}$ is provided in order for the service handler to find the corresponding public key of the paper look-up service in a key store database, which data base contains the public key of the paper look-up service corresponding to the private key of the paper look-up service. The concatenated data $KeyID_{PLS}\|ID_{AR}\|TS\|ID_{DP}\|R_{SH1}$ is then evaluated in a hash function to provide integrity of the authentication receipt AR. The paper look-up service identifier $KeyID_{PLS}$, the encryption of $ID_{AR}\|TS\|ID_{DP}$, the signed and encrypted random number $R_{SH1}$, and the hash value of $KeyID_{PLS}\|ID_{AR}\|TS\|ID_{DP}\|R_{SH1}$ are then concatenated, thus forming the authentication receipt AR.

Figure 6:
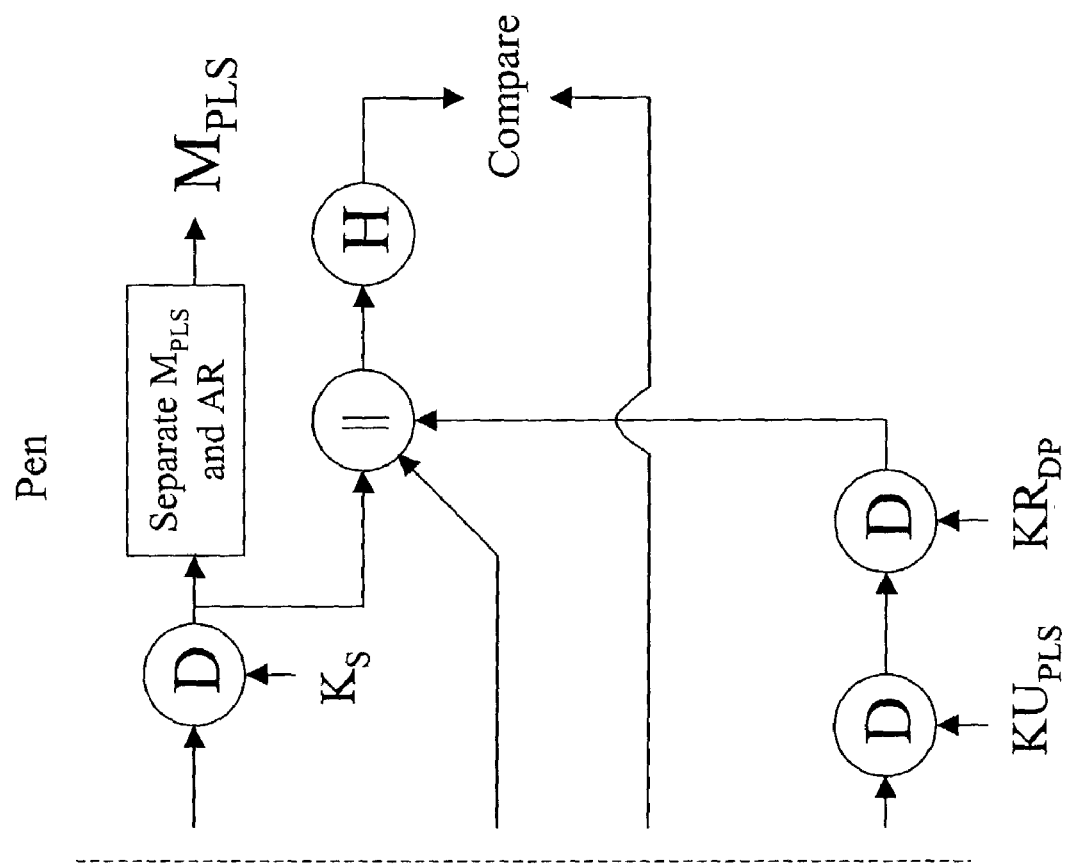
FIG. 6 is a block diagram showing yet another embodiment of the present invention when providing authentication, integrity, non-repudiation and confidentiality of the paper look-up service information data and the authentication receipt sent to the pen.
Figure 6:
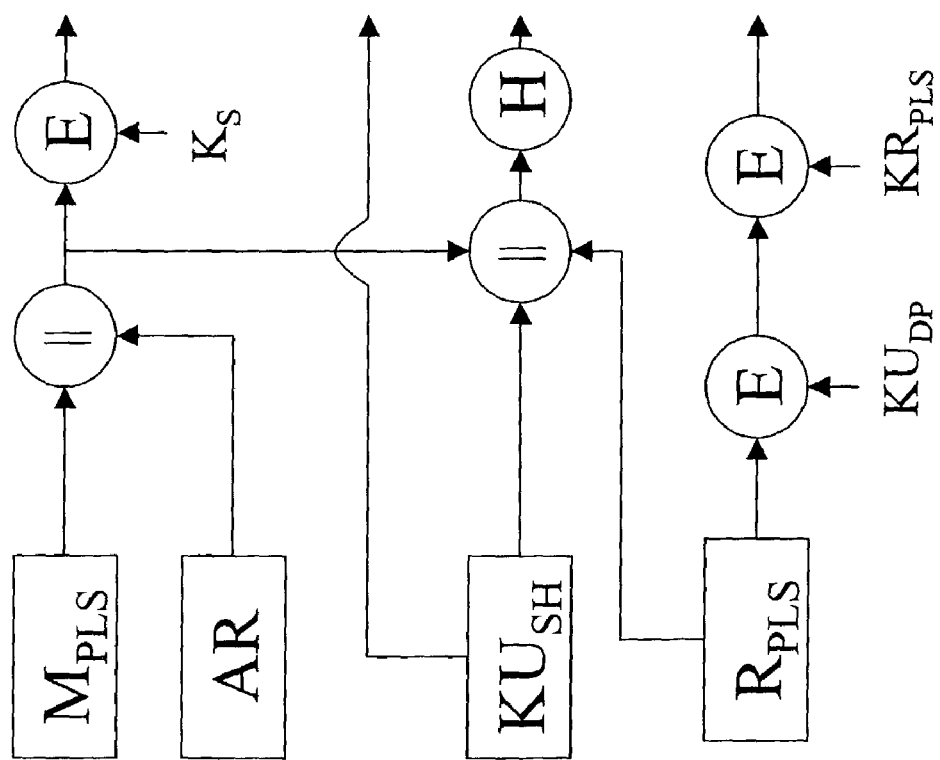

FIG. 6 demonstrates the operation of sending data from the paper look-up service to the pen. The authentication receipt AR and the paper look-up service information data $M_{PLS}$, which paper look-up service information data comprises the service handler identity, is encrypted using a symmetric key $K_S$ shared by the pen and the paper look-up service, which encryption provides confidentiality and authentication of AR and $M_{PLS}$. The public key of the service handler $KU_{SH}$ is later used for encryption of pen information data sent from the pen to the service handler. The paper look-up service information data $M_{PLS}$ includes a service handler key identifier, later used by the service handler. A random number $R_{PLS}$ is generated and encrypted with the public key $KU_{DP}$ of the pen, which encryption provides confidentiality of the random number. The encrypted random number is then encrypted with the private key $KR_{PLS}$ of the paper look-up service, thus providing the digital signature of said paper look-up service to the pen. It should be noted that if it is sufficient to authenticate the paper look-up service at the pen by means of decrypting the authentication receipt, this digital signature is not necessary. This signature is provided if non-repudiation of data sent from the paper look-up service to the pen is desired. AR, $M_{PLS}$, $KU_{SH}$ and $R_{PLS}$ are concatenated, and the concatenated data is evaluated in a hash function, thus obtaining integrity of the data sent to the pen. The pen decrypts $AR\|M_{PLS}$ and separates them, thereby acquiring the paper look-up service information data $M_{PLS}$. $AR\|M_{PLS}$ is concatenated with the public key $KU_{SH}$ of the service handler and the random number $R_{PLS}$. $AR\|M_{PLS}\|R_{PLS}\|KU_{SH}$ is evaluated in a hash function and compared to the hash value $H(AR\|M_{PLS}\|R_{PLS}\|KU_{SH})$ received from the paper look-up service, thus checking the integrity of the received data.

Figure 7:
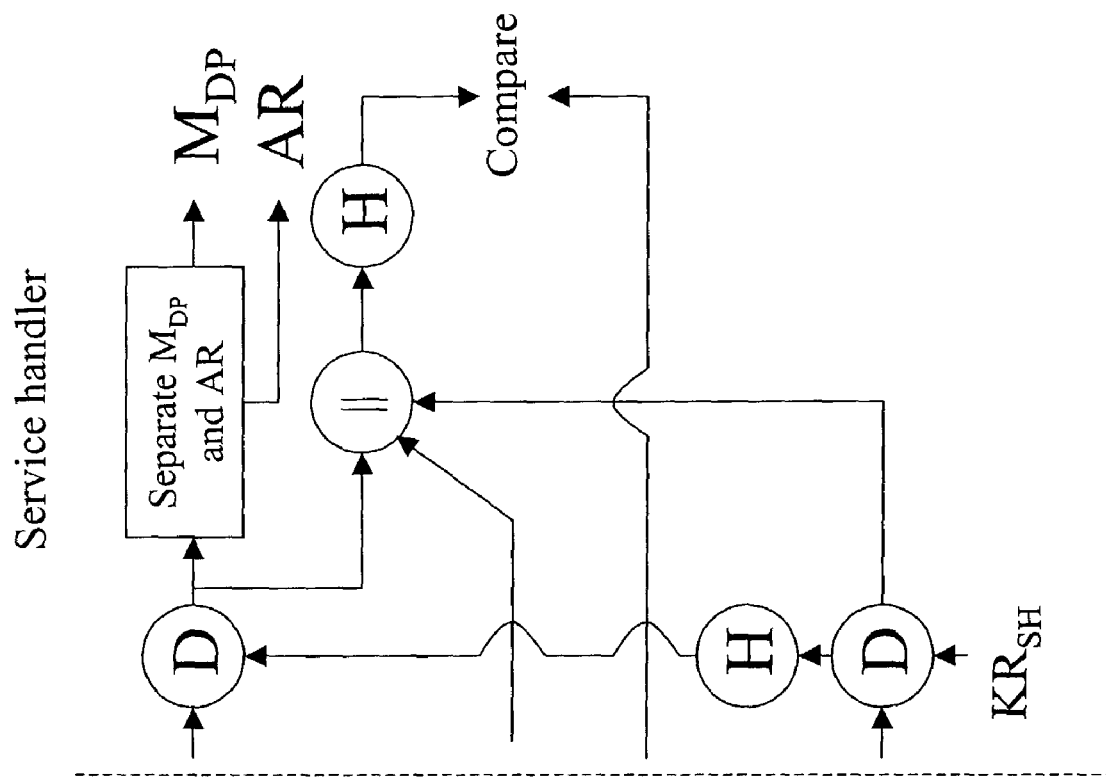
FIG. 7 is a block diagram showing further an embodiment of the present invention when providing authentication, integrity, non-repudiation and confidentiality of the pen information data and the authentication receipt sent to the service handler.
Figure 7:
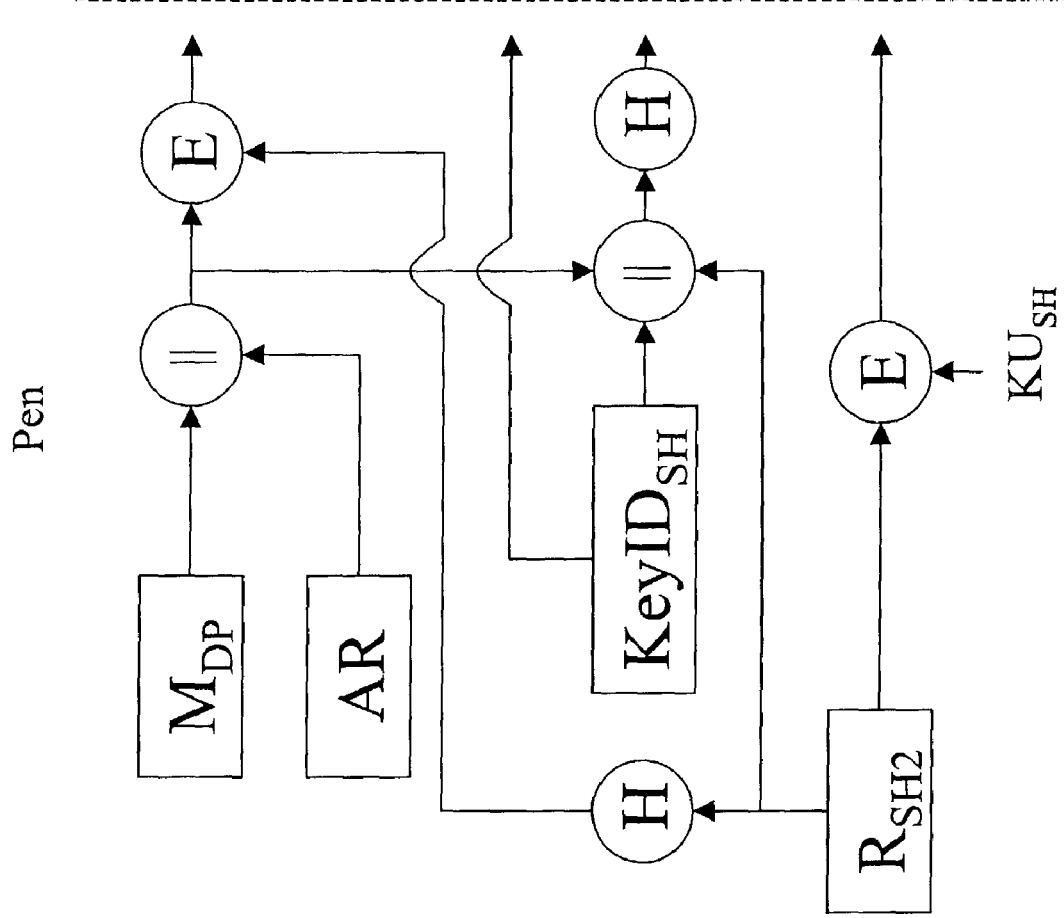

FIG. 7 shows the pen sending data to the service handler. A random number $R_{SH2}$ is generated and encrypted with the public key $KU_{SH}$ of the service handler, thus providing confidentiality of the random number. The random number is evaluated in a hash function. The pen information data $M_{DP}$ is concatenated with the authentication receipt AR and the hash value of the random number is used as a symmetric key for encrypting the concatenated data. The service handler key identifier $KeyID_{SH}$, which was included in the paper look-up service information data sent to the pen in FIG. 6, is provided so that the service handler can fetch, from a key store database, the corresponding private key $KR_{SH}$ to the public key $KU_{SH}$ of the service handler used to encrypt the random number $R_{SH2}$. $AR\|M_{DP}\|R_{SH2}\|KeyID_{SH}$ is evaluated in a hash function, thus providing integrity of the data sent to the service handler. The service handler decrypts the encrypted random number and evaluates the random number $R_{SH2}$ in a hash function. The hash value is used to decrypt the encrypted concatenated data $AR\|M_{DP}$. The pen information data concatenated with the authentication receipt $AR\|M_{DP}$ is concatenated with the random number $R_{SH2}$ and the service handler key identifier $KeyID_{SH}$, resulting in $AR\|M_{DP}\|R_{SH2}\|KeyID_{SH}$. $AR\|M_{DP}\|R_{SH2}\|KeyID_{SH}$ is evaluated in a hash function, and the hash value is compared to the received $H(AR\|M_{DP}\|R_{SH2}\|KeyID_{SH})$, thereby checking the integrity of the received data. The service handler separates $AR\|M_{DP}$, thereby acquiring the pen information data $M_{DP}$ and the authentication receipt AR.

Figure 8:
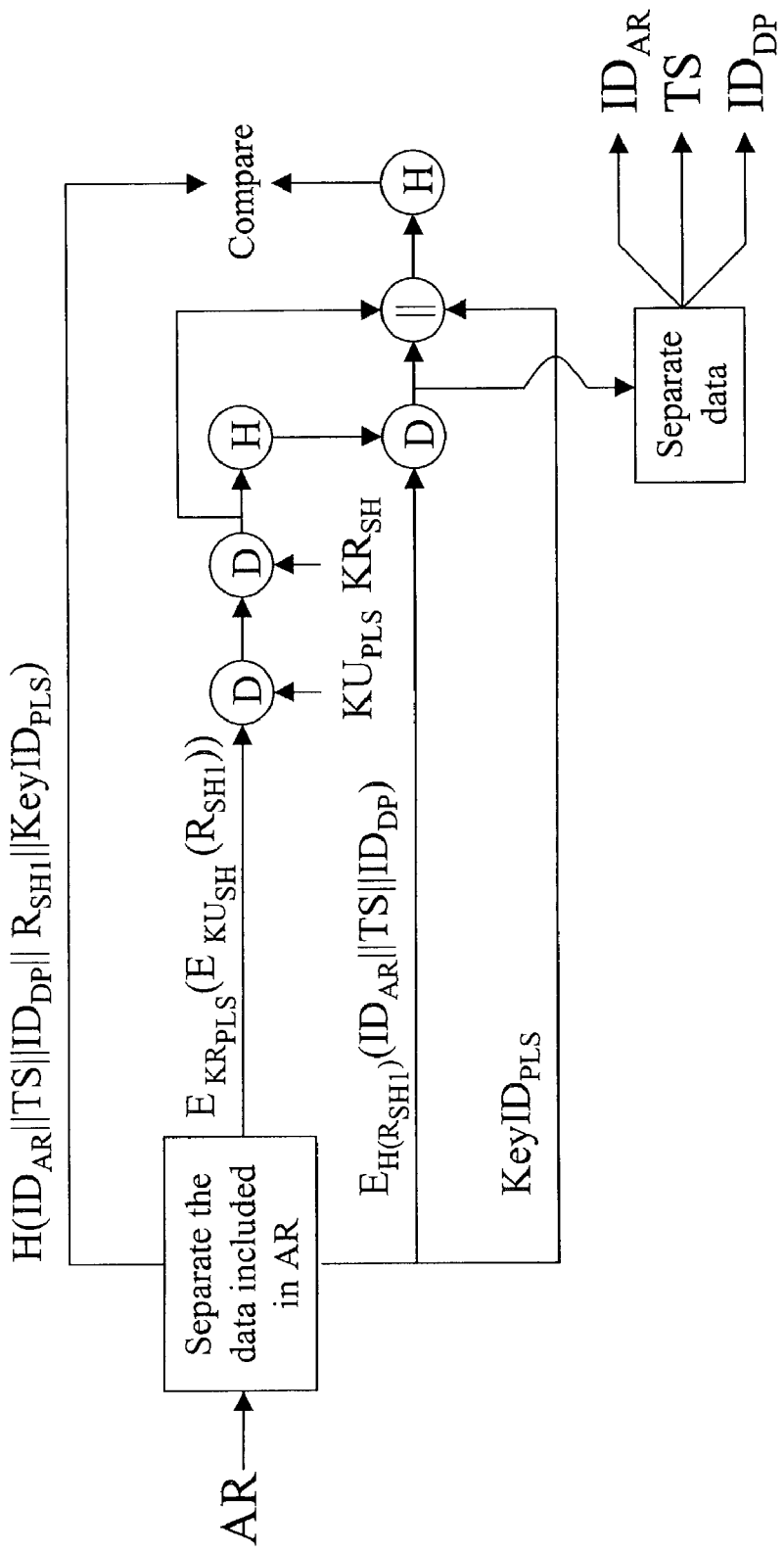
FIG. 8 is a block diagram showing another embodiment of the present invention when processing the authentication receipt at the service handler.

FIG. 8 describes the processing of the authentication receipt AR at the service handler. The service handler separates the data included in the authentication receipt into four parts. As mentioned earlier, the paper look-up service key identifier KeyID$_{PLS}$ is provided in order for the service handler to fetch the corresponding public key KU$_{PLS}$ of the paper look-up service from a key store database. The random number R$_{SH1}$ encrypted at the paper look-up service is decrypted with the public key KU$_{PLS}$ of the paper look-up service and the private key KR$_{SH}$ of the service handler, thus authenticating the receipt, i.e. making sure the authentication receipt originates from the paper look-up service, and recreating the random number R$_{SH1}$. The random number is evaluated in a hash function and the hash value H(R$_{SH1}$) is used to decrypt the encrypted authentication receipt identifier IDA, the timestamp TS and the pen identifier ID$_{DP}$. The three parameters ID$_{AR}$, TS and ID$_{DP}$ are then separated and thus recreated. As described earlier, a hash function is employed to evaluate the integrity of the data.

Figure 9:
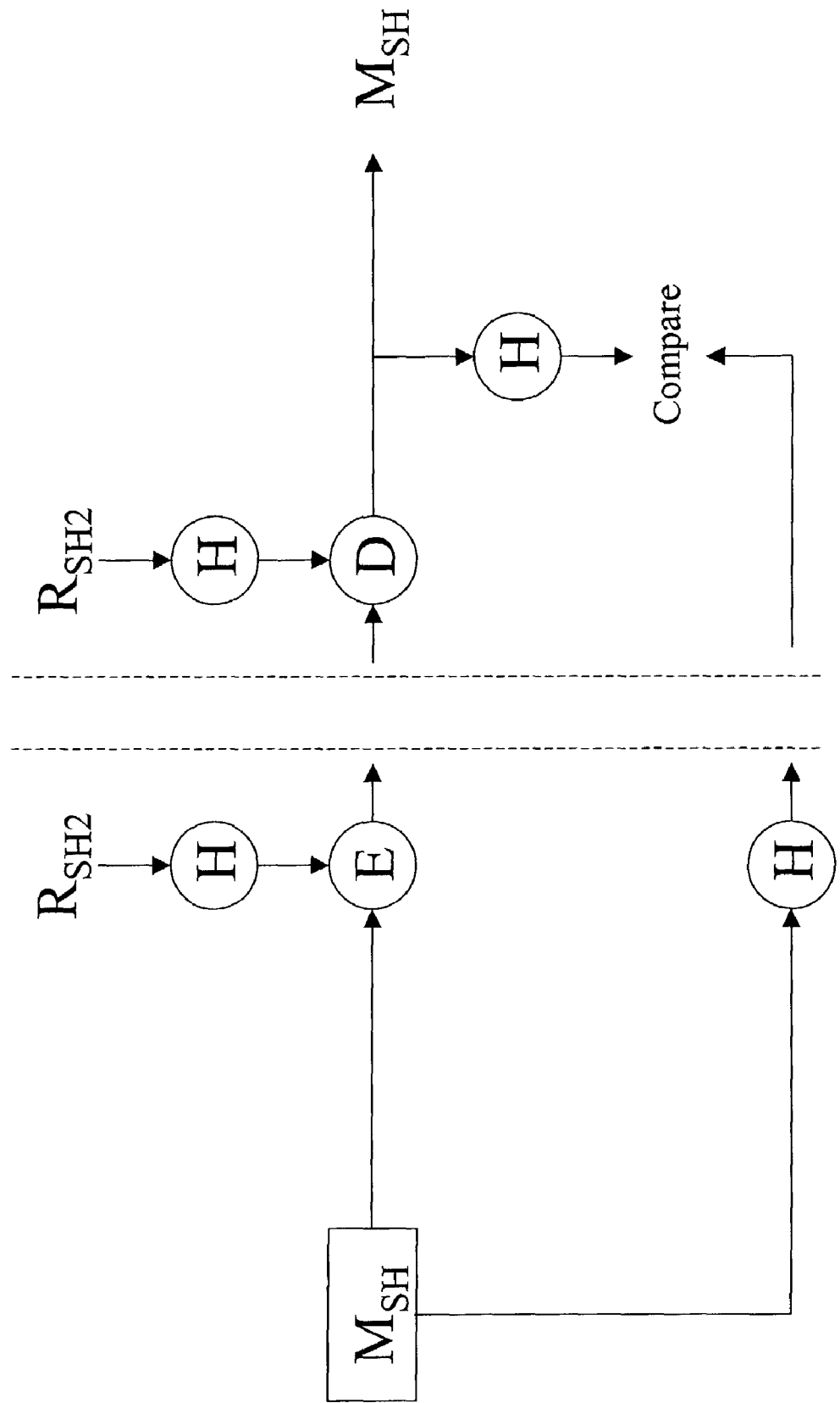
FIG. 9 is a block diagram showing yet another embodiment of the present invention when providing authentication, integrity and confidentiality of the service handler information data sent to the pen.

FIG. 9 illustrates how the service handler symmetrically encrypts the service handler information data M$_{SH}$, thus providing confidentiality of the data, with a hash value H(R$_{SH2}$) of the random number R$_{SH2}$ received from the pen as described in FIG. 7 and sends the encrypted service handler information data and a hash value of the service handler information data to the pen. The service handler information data M$_{SH}$ contains instructions what data the pen shall send to the service handler, and how the pen shall format and tag that data. The pen decrypts the encrypted service handler information data using the hash value of the random number R$_{SH2}$, thus recreating the service handler information data M$_{SH}$. The pen evaluates service handler information data M$_{SH}$ in a hash function and compares the hash value to the received hash value, thus checking integrity. The pen then sends the requested pen information data to the service provider as described in FIG. 7. Note that when sending data this time, the pen does not need to generate a new random number. If, however, it is considered necessary for security reasons, the pen will generate a new random number. The pen again uses the hash value of R$_{SH2}$ to symmetrically encrypt the pen information data and the authentication receipt. R$_{SH2}$ is not sent to the service handler, as the service handler already has access to the random number R$_{SH2}$ necessary to decrypt the pen information data and the authentication receipt. Neither does the pen need to send the service handler key identifier KeyID$_{SH}$ this time, since the service handler already has access to it.

Even though the invention has been described with reference to specific exemplifying embodiments thereof, many different alterations, modifications and the like will become apparent for those skilled in the art. The described embodiments are therefore not intended to limit the scope of the invention, as defined by the appended claims.

The invention claimed is:

1. A method for authenticating a digital pen at a service handler in a system including at least one paper look-up server, at least one digital pen and at least one service handler, the method including the steps of:

sending encrypted data and a digital pen identifier from said digital pen to said paper look-up server, said encrypted data including position data obtained by using said digital pen to read a position code from a surface of a position-coded product;

identifying at said paper look-up server, based on said position data, a service handler that provides a service associated with said position-coded product;

authenticating said digital pen and creating an authentication receipt at said paper look-up server;

sending an indication of the identified service handler and said authentication receipt from said paper look-up server to said digital pen;

sending said authentication receipt from said digital pen to said identified service handler; and authenticating said digital pen at said identified service handler based on the received authentication receipt thereby allowing said identified service handler to provide a service associated with said position-coded product.

2. The method according to claim 1, wherein the encryption of data is performed with a symmetric key at said digital pen.

3. The method according to claim 1, wherein said encrypted data includes a digital signature created by said digital pen.

4. The method according to claim 1, including providing, at the paper look-up server, the authentication receipt with a first digital signature created by the paper look-up server.

5. The method according to claim 4, wherein the step of authenticating said digital pen at said service handler includes authenticating said authentication receipt by means of said first digital signature created by the paper look-up server.

6. The method according to claim 4, including creating a second digital signature at the paper look-up server.

7. The method according to claim 6, wherein the step of sending said authentication receipt from said paper look-up server to said digital pen includes sending said second digital signature.

8. The method according to claim 7, including authenticating said paper look-up server at said digital pen by means of said second digital signature before sending the authentication receipt to the service handler.

9. The method according to claim 1, including providing, at the paper look-up server, the authentication receipt with a unique identifier.

10. The method according to claim 9, including encrypting said unique identifier.

11. The method according to claim 1, including providing, at the paper look-up server, the authentication receipt with a timestamp.

12. The method according to claim 11, including providing, at the paper look-up server, the timestamp with a predetermined lifetime.

13. The method according to claim 11, including encrypting said timestamp.

14. The method according to claim 1, including providing, at the paper look-up server, the authentication receipt with the digital pen identifier.

15. The method according to claim 14, including encrypting said digital pen identifier.

16. The method according to claim 1, including providing, at the paper look-up server, the authentication receipt with a paper look-up server key identifier.

17. The method according to claim 10, wherein said encryption is performed with a symmetric key.

18. The method according to claim 1 including encrypting said authentication receipt at said paper look-up server.

19. The method according to claim 18, wherein said encryption of said authentication receipt is performed with a symmetric key.

20. The method according to claim 18, including the steps of:

decrypting said authentication receipt at the digital pen; and encrypting the decrypted authentication receipt at the digital pen.

21. The method according to claim 20, wherein said encryption of said authentication receipt is performed with a symmetric key.

22. A system for authentication including:
   at least one digital pen;
   at least one paper look-up server; and
   at least one service handler, wherein
   said digital pen is arranged to send encrypted data, including position data obtained by using said digital pen to read a position code from a surface of a position-coded product, and a digital pen identifier to said paper look-up server, receive an authentication receipt from said paper look-up server and send said authentication receipt to said service handler;
   said paper look-up server is arranged to authenticate said digital pen, create said authentication receipt, identify, based on said position data, a service handler that provides a service associated with said position-coded product, and send an indication of the identified service handler and said authentication receipt to said digital pen; and
   said identified service handler is arranged to authenticate said digital pen based on the received authentication receipt thereby allowing said identified service handler to provide a service associated with said position-coded product.

23. The system according to claim 22, wherein said digital pen is arranged to perform the encryption of data with a symmetric key.

24. The system according to claim 22, wherein said digital pen is arranged to create a digital signature and include said digital signature in the encrypted data.

25. The system according to claim 22, wherein said paper look-up server is arranged to provide the authentication receipt with a first digital signature created by the paper look-up server.

26. The system according to claim 25, wherein said service handler is arranged to authenticate said digital pen by authenticating said authentication receipt by means of said first digital signature created by the paper look-up server.

27. The system according to claim 25, wherein said paper look-up server is arranged to create a second digital signature.

28. The system according to claim 27, wherein said paper look-up server is arranged to send said second digital signature to the digital pen.

29. The system according to claim 28, wherein said digital pen is arranged to authenticate said paper look-up server by means of said second digital signature before sending said authentication receipt to said service handler.

30. The system according to claim 22, wherein the paper look-up server is arranged to provide the authentication receipt with a unique identifier.

31. The system according to claim 30, wherein the paper look-up server is arranged to encrypt said unique identifier.

32. The system according to claim 22, wherein the paper look-up server is arranged to provide the authentication receipt with a timestamp.

33. The system according to claim 32, wherein the paper look-up server is arranged to provide the timestamp with a predetermined lifetime.

34. The system according to claim 32, wherein the paper look-up server is arranged to encrypt said timestamp.

35. The system according to claim 22, wherein the paper look-up server is arranged to provide the authentication receipt with the digital pen identifier.

36. The system according to claim 35, wherein the paper look-up server is arranged to encrypt said digital pen identifier.

37. The system according to claim 22, wherein the paper look-up server is arranged to provide the authentication receipt with a paper look-up server key identifier.

38. The system according to claim 31, wherein the paper look-up server is arranged to perform said encryption with a symmetric key.

39. The system according to claim 22, wherein said paper look-up server is arranged to encrypt said authentication receipt.

40. The system according to claim 39, wherein said paper look-up server is arranged to encrypt said authentication receipt with a symmetric key.

41. The system according to claim 39, wherein
   said digital pen is arranged to decrypt said authentication receipt; and
   said digital pen is arranged to encrypt the decrypted authentication receipt.

42. The system according to claim 41, wherein said digital pen is arranged to encrypt said authentication receipt with a symmetric key.

43. A computer-readable medium storing computer-executable components for causing a unit to perform the steps recited in claim 1 when the computer-executable components are run on microprocessor included by the unit.

* * * * *